US012579309B2

(12) United States Patent
Furukawa

(10) Patent No.: US 12,579,309 B2
(45) Date of Patent: Mar. 17, 2026

(54) ANONYMIZATION APPARATUS

(71) Applicant: NEC Corporation, Tokyo (JP)

(72) Inventor: Ryo Furukawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 126 days.

(21) Appl. No.: 18/408,767

(22) Filed: Jan. 10, 2024

(65) Prior Publication Data

US 2024/0249024 A1    Jul. 25, 2024

(30) Foreign Application Priority Data

Jan. 19, 2023    (JP) ................................ 2023-006804

(51) Int. Cl.
*G06F 21/62*        (2013.01)

(52) U.S. Cl.
CPC ............................... *G06F 21/6254* (2013.01)

(58) Field of Classification Search
CPC ................................................ G06F 21/6254
See application file for complete search history.

(56) References Cited

U.S. PATENT DOCUMENTS

2015/0033356 A1* 1/2015 Takenouchi ........ G06F 21/6254
                                                         726/26
2015/0339488 A1* 11/2015 Takahashi ............. G06F 16/285
                                                         726/29

2019/0130131 A1* 5/2019 Huang .................. G06F 16/285
2022/0293280 A1* 9/2022 Baker ..................... G16H 50/30
2024/0012916 A1* 1/2024 Tanaka .................. G06F 21/604
2024/0046424 A1* 2/2024 Takahashi ............. G06T 3/4053
2024/0062247 A1* 2/2024 Etou .................. G06Q 30/0201
2024/0070324 A1* 2/2024 Cuellar Jaramillo ........................
                                                         G06F 21/6245
2024/0143838 A1* 5/2024 Ardhanari .............. G16H 30/40
2024/0220451 A1* 7/2024 Chiba ..................... G06F 21/64
2024/0241987 A1* 7/2024 Rosenbaum ........ G06F 21/6254
2024/0320371 A1* 9/2024 Maeda ................. G06V 40/161
2025/0055836 A1* 2/2025 Ueki ................... H04L 63/0428
2025/0077709 A1* 3/2025 Epasto .................. G06N 5/022
2025/0157269 A1* 5/2025 Sekiya .................. G07C 5/008

FOREIGN PATENT DOCUMENTS

JP            2016-038780 A        3/2016

* cited by examiner

*Primary Examiner* — Stephen T Gundry

(74) *Attorney, Agent, or Firm* — Sughrue Mion, PLLC

(57)                    ABSTRACT

An anonymization apparatus includes: an acquiring unit that acquires boundary information indicating the boundary between clusters, specified by performing an anonymization process on predetermined data; and a dividing unit that generates an anonymized cluster set by dividing data possessed by the anonymization apparatus into a plurality of clusters based on the boundary information acquired by the acquiring unit.

8 Claims, 13 Drawing Sheets

ANONYMIZATION SYSTEM 100

Fig.3

BOUNDARY DETERMINATION
APPARATUS 200

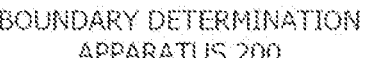

```
                                          ┌──250                        ┌──240
                              ┌──────────────────────────┐  ┌──────────────────────────┐
                              │  OPERATION               │  │  STORING UNIT            │
                              │  PROCESSING UNIT         │  │                          │
   ┌──210                     │                          │  │                 ┌──241   │
┌────────────┐                │              ┌──251      │  │         ┌───────────────┐│
│ OPERATION  │                │     ┌───────────────┐    │  │         │  CONSENTED    ││
│ INPUT UNIT │────────────────│     │ ACQUIRING UNIT│    │  │         │    DATA       ││
└────────────┘                │     └───────────────┘    │  │         └───────────────┘│
                              │                          │  │                          │
   ┌──220                     │              ┌──252      │  │                 ┌──242   │
┌────────────┐                │     ┌───────────────┐    │  │         ┌───────────────┐│
│  SCREEN    │                │     │ MERGING UNIT  │    │  │         │   DIVISION    ││
│DISPLAY UNIT│────────────────│     └───────────────┘    │  │         │   BOUNDARY    ││
└────────────┘                │                          │  │         │ INFORMATION   ││
                              │              ┌──253      │  │         └───────────────┘│
   ┌──230                     │     ┌───────────────┐    │  │                          │
┌────────────┐                │     │ ANONYMIZING   │    │  │                          │
│COMMUNICATION│               │     │    UNIT       │    │  │                          │
│ I/F UNIT   │────────────────│     └───────────────┘    │  │                          │
└────────────┘                │                          │  │                          │
                              │              ┌──254      │  │                          │
                              │     ┌───────────────┐    │  │                          │
                              │     │  BOUNDARY     │    │  │                          │
                              │     │ INFORMATION   │    │  │                          │
                              │     │ACQUIRING UNIT │    │  │                          │
                              │     └───────────────┘    │  │                          │
                              │                          │  │                          │
                              │              ┌──255      │  │                          │
                              │     ┌───────────────┐    │  │                          │
                              │     │  BOUNDARY     │    │  │                          │
                              │     │ INFORMATION   │    │  │                 ┌──243   │
                              │     │TRANSMITTING   │    │  │         ┌───────────────┐│
                              │     │    UNIT       │    │  │         │   PROGRAM     ││
                              │     └───────────────┘    │  │         └───────────────┘│
                              │                          │  │                          │
                              └──────────────────────────┘  └──────────────────────────┘
```

Fig.4

ORGANIZATION A

| IDENTIFICATION INFORMATION | COMMON QUASI-IDENTIFIER | COMMON QUASI-IDENTIFIER | ······ | A UNIQUE QUASI-IDENTIFIER | ······ |
|---|---|---|---|---|---|
| | | | | | |
| | | | | | |
| | | | | | |

ORGANIZATION B

| IDENTIFICATION INFORMATION | COMMON QUASI-IDENTIFIER | COMMON QUASI-IDENTIFIER | ······ | B UNIQUE QUASI-IDENTIFIER | ······ |
|---|---|---|---|---|---|
| | | | | | |
| | | | | | |
| | | | | | |

Fig.5

| CLUSTER ID | QUASI-IDENTIFIER | QUASI-IDENTIFIER | QUASI-IDENTIFIER | ....... |
|---|---|---|---|---|
| | ~ | ~ | ~ | |
| | ~ | ~ | ~ | |
| | | | | |

ANONYMIZATION APPARATUS

INCORPORATION BY REFERENCE

This application is based upon and claims the benefit of priority from Japanese patent application No. 2023-006804, filed on Jan. 19, 2023, the disclosure of which is incorporated herein in its entirety by reference.

TECHNICAL FIELD

The present invention relates to an anonymization apparatus, an anonymization method, and a determination apparatus.

BACKGROUND ART

An anonymization process such as k-anonymization is performed for the purpose of protection of privacy when using data, and so forth.

An example of a document that describes an anonymization process is Patent Literature 1. Patent Literature 1 describes an information processing system that includes a plurality of generating units each generating a database about customers and a merging unit merging a plurality of databases generated by the plurality of generating units. According to Patent Literature 1, the merging unit merges a plurality of databases so as to merge characteristic data having similar customer characteristics represented by reference data that is a common characteristic between the databases.

Patent Literature 1: Japanese Unexamined Patent Application Publication No. JP-A 2016-038780

In the case of merging anonymization processing information as described in Patent Literature 1, there is a risk of merging clusters that the average values are close but the similarity of the clusters as a whole is low due to the fact that the ways of cutting into clusters when anonymizing vary with organization. As a result of thus merging clusters with low similarity, there is a risk that the accuracy of analysis after the merge decreases. For example, there is a problem that it may be difficult to perform an anonymization process that allows accurate analysis after the merge as described above.

SUMMARY OF THE INVENTION

Accordingly, an object of the present invention is to provide an anonymization apparatus, an anonymization method and a determination apparatus that can solve the abovementioned problem.

In order to achieve the object, an anonymization apparatus as an aspect of the present disclosure includes at least one memory configured to store instructions and at least one processor configured to execute the instructions. The processor is configured to execute the instructions to: acquire boundary information indicating a boundary between clusters, specified by performing an anonymization process on predetermined data; and generate an anonymized cluster set by dividing data possessed by the anonymization apparatus into a plurality of clusters based on the acquired boundary information.

Further, an anonymization method as another aspect of the present disclosure is an anonymization method by an information processing apparatus. The anonymization method includes: acquiring boundary information indicating a boundary between clusters, specified by performing an anonymization process on predetermined data; and generating an anonymized cluster set by dividing data possessed by the anonymization apparatus into a plurality of clusters based on the acquired boundary information.

Further, a recording medium as another aspect of the present disclosure is a non-transitory computer-readable recording medium on which a program is recorded. The program includes instructions for causing an information processing apparatus to realize processes to: acquire data from a plurality of organizations; merge the acquired data and perform an anonymization process; and acquire boundary information indicating a boundary between clusters based on a result of the anonymization process.

Further, a determination apparatus as another aspect of the present disclosure includes at least one memory configured to store instructions and at least one processor configured to execute the instructions. The processor is configured to execute the instructions to: acquire data from a plurality of organizations; merge the acquired data and perform an anonymization process; and acquire boundary information indicating a boundary between clusters based on a result of the anonymization process.

With the configurations as described above, the problem as described above can be solved.

BRIEF DESCRIPTION OF DRAWINGS

FIG. 3 is a block diagram showing an example of the configuration of a boundary determination apparatus;

FIG. 4 is a view showing an example of consented data;

FIG. 5 is a view showing an example of division boundary information;

EXAMPLE EMBODIMENT

First Example Embodiment

Figure 1:
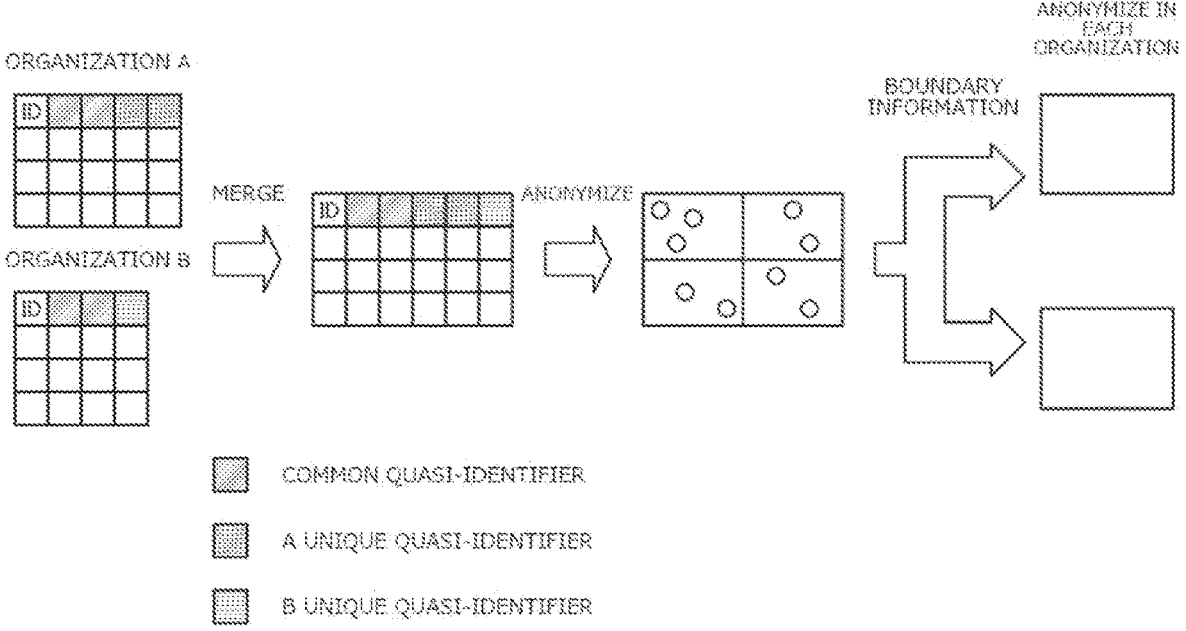
FIG. 1 is a view for describing the overview of the present disclosure.
Figure 2:
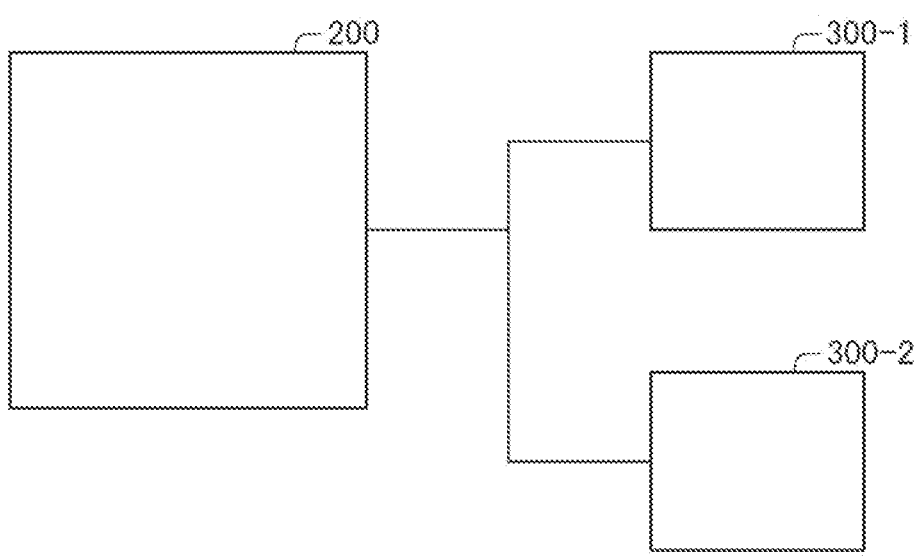
FIG. 2 is a view showing an example of the overall configuration of an anonymization system.
Figure 6:
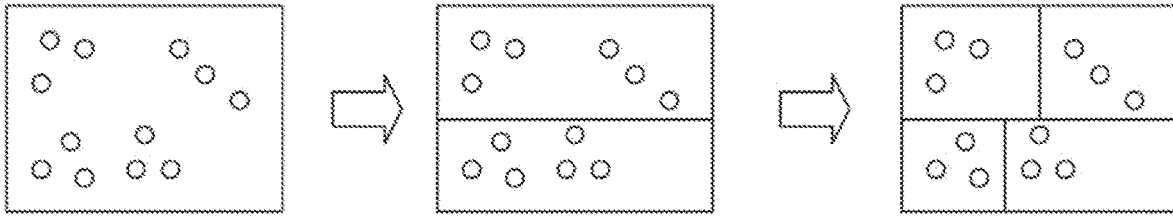
FIG. 6 is a view showing an example of an anonymization process.

A first example embodiment of the present disclosure will be described with reference to FIGS. 1 to 10. FIG. 1 is a view for describing the overview of the present invention. FIG. 2 is a view showing an example of the overall configuration of an anonymization system 100. FIG. 3 is a block diagram showing an example of the configuration of a boundary determination apparatus 200. FIG. 4 is a view showing an example of consented data 241. FIG. 5 is a view showing an example of division boundary information 242. FIG. 6 is a view showing an example of an anonymization process.

Figure 7:
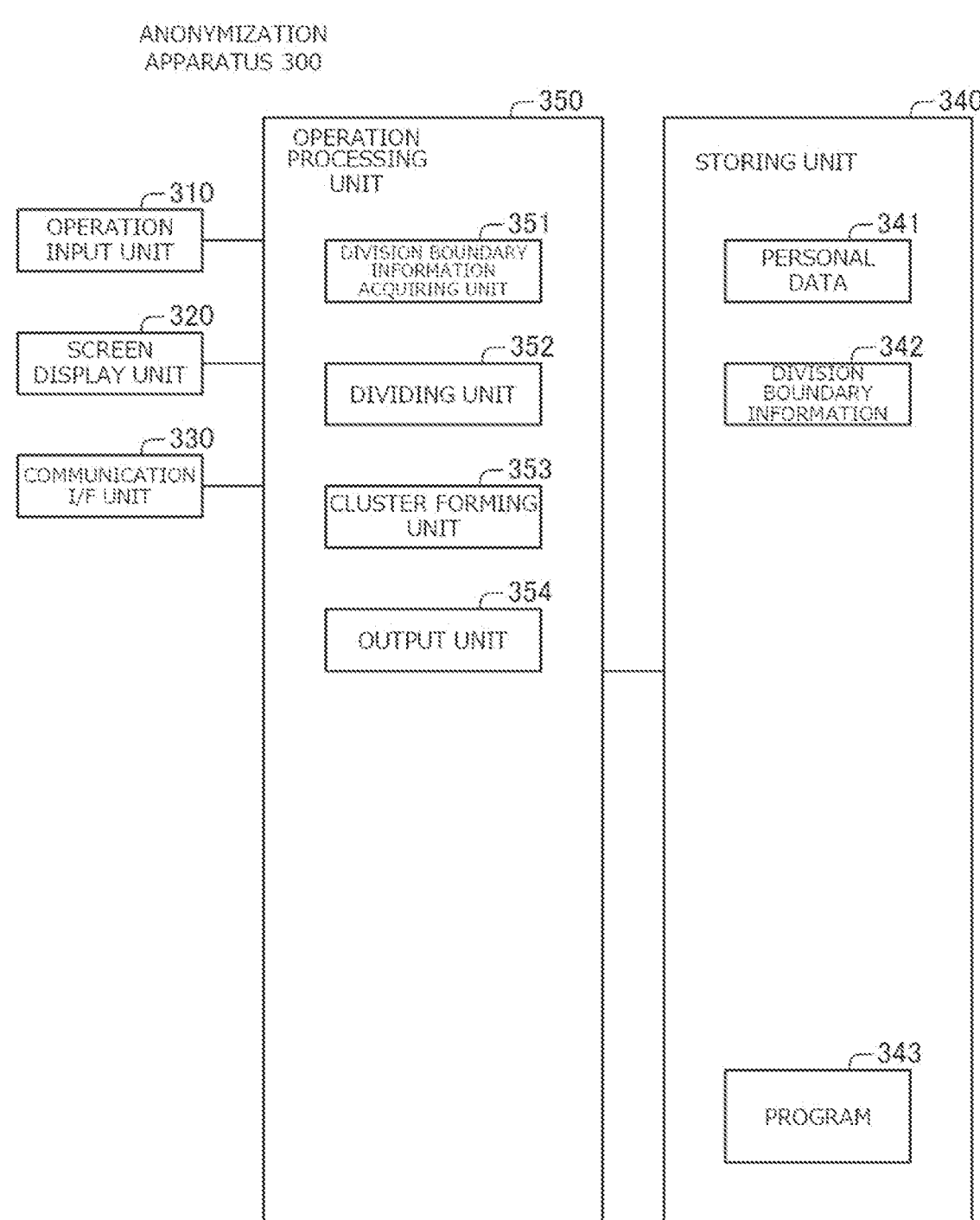
FIG. 7 is a block diagram showing an example of the configuration of an anonymization apparatus.
Figure 8:
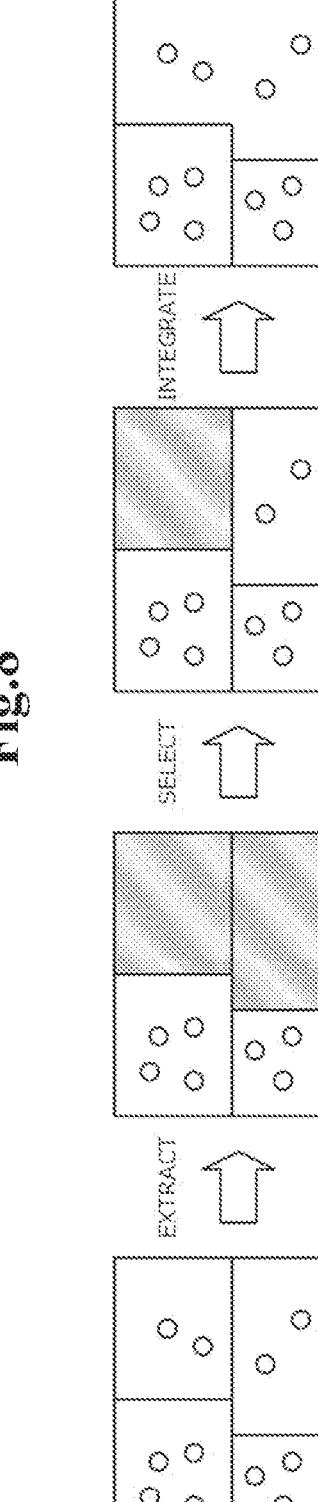
FIG. 8 is a view showing an example of cluster formation.
Figure 9:
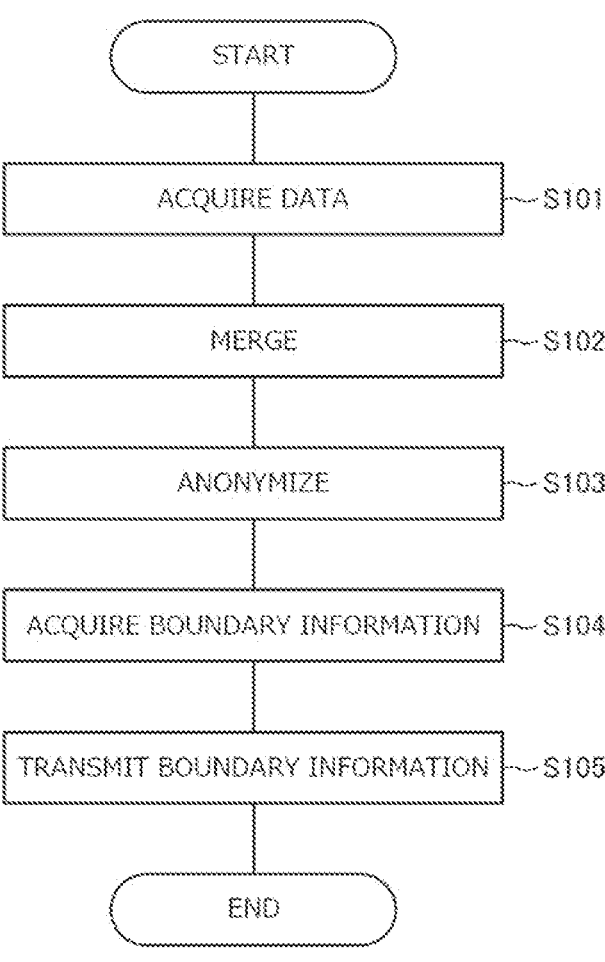
FIG. 9 is a flowchart showing an example of the operation of the boundary determination apparatus.
Figure 10:
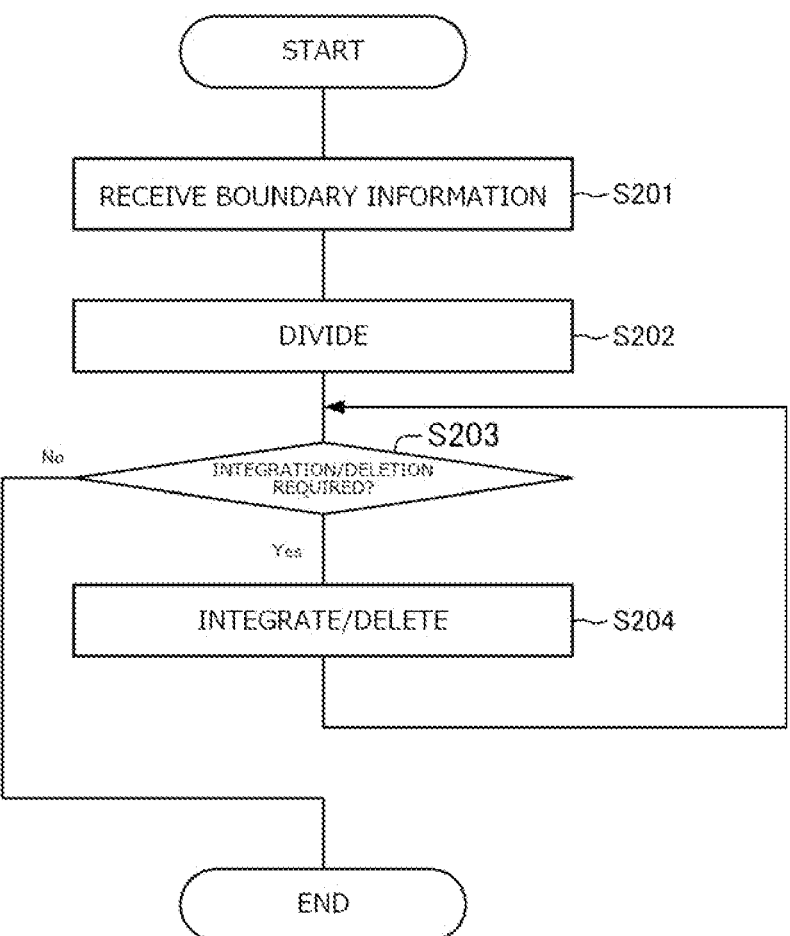
FIG. 10 is a flowchart showing an example of the operation of the anonymization apparatus.

FIG. 7 is a block diagram showing an example of the configuration of an anonymization apparatus 300. FIG. 8 is a view showing an example of cluster formation. FIG. 9 is a flowchart showing an example of the operation of the boundary determination apparatus 200. FIG. 10 is a flowchart showing an example of the operation of the anonymization apparatus 300.

In the first example embodiment of the present disclosure, as shown in FIG. 1, an anonymization system 100 that performs, in each of a plurality of organizations, an anonymization process that is anonymizing data possessed by the organization will be described. For example, in a case illustrated by FIG. 1, an organization A has data including a common quasi-identifier and an A unique quasi-identifier, and an organization B has data including the common quasi-identifier and a B unique quasi-identifier. For at least part of the data possessed by the organization A and at least part of the data possessed by the organization B, consent to disclosure of data that is personal information to outside parties or merge the data with data possessed by another organization has been obtained. In these cases, the anonymization system 100 acquires data for which consent has been obtained from the respective organizations and merges the data, and then performs the anonymization process. Moreover, the anonymization system 100 acquires boundary information indicating the boundary between clusters formed by the anonymization process based on the result of the anonymization process. After that, the anonymization system 100 transmits the boundary information to each of the organizations, and performs the anonymization process in each of the organizations targeting the data possessed by the organization. For example, as described above, the anonymization system 100 performs the anonymization process on data including data for which consent has not been obtained, based on the boundary information specified based on consented data that is at least part of the data possessed by each of the organizations. Consent to disclosure and merge of data that is personal information may be acquired by any method.

Further, as will be described later, each of the organizations included by the anonymization system 100 can integrate clusters that satisfy a predetermined condition after performing the anonymization process using the boundary information. For example, in a case where data possessed by the organization is divided into clusters using the boundary information, the number of data present in a cluster may fall below a predetermined value k and the condition of k-anonymity may no longer be satisfied. In such a case, the anonymization system 100 integrates the clusters based on the numbers of data in the clusters, and so forth. Consequently, the numbers of data in the clusters become k or more, and k-anonymity can be satisfied. In other words, by integrating the clusters as necessary after division based on the boundary information, the anonymization system 100 can ensure k-anonymity while performing anonymization based on the boundary information. Meanwhile, the anonymization system 100 may be configured to delete the cluster instead of or along with integration of the clusters. The predetermined value k is an anonymization parameter used for performing the anonymization process. The anonymization parameter may be set in any manner, or may be set in accordance with an anonymization parameter possessed by an external device, for example.

In the present disclosure, a quasi-identifier refer to an attribute such as age, gender and date of birth that can identify a person when combined. A quasi-identifier may include an attribute other than those illustrated above. A common quasi-identifier refers to a quasi-identifier commonly included in data possessed by the respective organizations included by the anonymization system 100. For example, in the case illustrated by FIG. 1, a quasi-identifier commonly included in the data possessed by the organization A and the data possessed by the organization B is a common quasi-identifier. A unique quasi-identifier refers to a quasi-identifier included only in data possessed by one or some of the organizations included by the anonymization system 100. For example, in the case illustrated by FIG. 1, the data possessed by the organization A includes the A unique quasi-identifier, whereas the data possessed by the organization B does not include the A unique quasi-identifier.

Further, in the present disclosure, a method that can define the boundary between clusters in the feature value space is used as a method of the anonymization process. In other words, the anonymization system 100 performs the anonymization process by forming clusters so that no overlap occurs. For example, the boundary between clusters is defined by a combination of line segments parallel to the respective axes. Such a method may be realized by local recoding such as the Mondrian method. Meanwhile, the anonymization system 100 may perform anonymization by, for example, global recoding, not limited to the case illustrated above.

FIG. 2 shows an example of the overall configuration of the anonymization system 100. Referring to FIG. 2, for example, the anonymization system 100 has a boundary determination apparatus 200, and anonymization apparatuses 300 (anonymization apparatus 300-A, anonymization apparatus 300-B, . . . ; hereinafter, referred to as the anonymization apparatus 300 unless otherwise distinguished). For example, in a case illustrated by FIG. 2, the organization A has the anonymization apparatus 300-A, and the organization B has the anonymization apparatus 300-B. As shown in FIG. 2, the boundary determination apparatus 200 and the anonymization apparatuses 300 are connected so as to be able to communicate with each other by wire or the like.

The configuration of the anonymization system 100 is not limited to the case illustrated by FIG. 2. For example, the anonymization system 100 may include three or more anonymization apparatuses 300, or may be configured so that one anonymization apparatus 300 performs the anonymization process individually on data possessed by a plurality of organizations. Moreover, at least one or some of the anonymization apparatuses 300 may have a function as the boundary determination apparatus 200 to be described later. The anonymization system 100 may have a modification example other than those illustrated above, for example, may include a plurality of boundary determination apparatuses 200.

The boundary determination apparatus 200 is an information processing apparatus that acquires boundary information based on, of the data possessed by each of the anonymization apparatuses 300, data for which consent to disclosure to outside parties and merge with the data possessed by the other organization has been obtained. For example, when acquiring the data for which the consent has been obtained as described above from the respective anonymization apparatuses 300 and merging the acquired data to perform the anonymization process, the boundary determination apparatus 200 then acquires boundary information indicating the boundary between clusters formed by the anonymization process. Moreover, the boundary determination apparatus 200 transmits the acquired boundary information to each of the anonymization apparatuses 300.

FIG. 3 shows an example of the configuration of the boundary determination apparatus 200. Referring to FIG. 3, the boundary determination apparatus 200 has, as major components, an operation input unit 210, a screen display unit 220, a communication I/F unit 230, a storing unit 240, and an operation processing unit 250, for example.

FIG. 3 illustrates a case where a function as the boundary determination apparatus 200 is realized using one information processing apparatus. However, the boundary determination apparatus 200 may be realized using a plurality of information processing apparatuses, for example, may be realized on the cloud. Moreover, the boundary determination apparatus 200 may not include part of the configuration illustrated above, for example, may not have the operation input unit 210 or the screen display unit 220, or the boundary determination apparatus 200 may have a configuration other than the configuration illustrated above.

The operation input unit 210 includes an operation input device such as a keyboard and a mouse. The operation input unit 210 detects an operation by an operator who operates the boundary determination apparatus 200, and outputs to the operation processing unit 250.

The screen display unit 220 includes a screen display device such as an LCD (Liquid Crystal Display). The screen display unit 220 can display on a screen a variety of information and the like stored in the storing unit 240 in response to an instruction from the operation processing unit 250.

The communication I/F unit 230 includes a data communication circuit and the like. The communication I/F unit 230 performs data communication with an external device connected via a communication line.

The storing unit 240 is a storage device such as a hard disk memory and a memory. The storing unit 240 stores processing information necessary for a variety of processing by the operation processing unit 250 and a program 243. The program 243 is loaded to and executed by the operation processing unit 250 to realize various processing units. The program 243 is loaded in advance from an external device or a recording medium via a data input/output function such as the communication I/F unit 230, and stored into the storing unit 240. Major information stored in the storing unit 240 includes, for example, the consented data 241 and the division boundary information 242.

The consented data 241 includes data for which consent to disclosure and merge has been obtained among the data possessed by each of the organizations. In other words, the consented data 241 includes at least part of the data possessed by the anonymization apparatus 300-A and at least part of the data possessed by the anonymization apparatus 300-B. For example, the consented data 241 is updated in response to acquisition of data from the anonymization apparatus 300 by an acquiring unit 251 to be described later.

FIG. 4 shows an example of the consented data 241. In the present disclosure, the consented data 241 includes data acquired from the anonymization apparatus 300-A and data acquired from the anonymization apparatus 300-B. Referring to FIG. 4, in the consented data 241, for example, any identification information such as ID (identification) assigned to each person, a common quasi-identifier, and a unique quasi-identifier are associated. For example, the data acquired from the anonymization apparatus 300-A among the consented data 241 includes identification information, a common quasi-identifier, and a A unique quasi-identifier. The data acquired from the anonymization apparatus 300-B among the consented data 241 includes identification information, a common quasi-identifier, and a B unique quasi-identifier. The consented data 241 may include an identifier which is an attribute that can solely identify a person, such as name.

The division boundary information 242 includes boundary information indicating the boundary between clusters formed by the anonymization process. As will be described later, the boundary information can indicate the boundary between clusters by indicating the range of each of the attributes belonging to the clusters. For example, the division boundary information 242 is updated in response to acquisition of the boundary information by the boundary information acquiring unit 254 to be described later from the result of the anonymization process using the consented data 241 by the anonymizing unit 253.

FIG. 5 shows an example of the division boundary information 242. Referring to FIG. 5, in the division boundary information 242, for example, identification information such as a cluster ID for identifying a cluster, and information indicating the range of each quasi-identifier such as a common quasi-identifier and a unique quasi-identifier are associated. For example, as illustrated in FIG. 5, the division boundary information 242 may represent the range of each quasi-identifier for each cluster in a tabular format.

The division boundary information 242 may represent the range of each quasi-identifier for each cluster in a format other than a tabular format. Moreover, the division boundary information 242 may be, for example, information indicating the location of each division axis, instead of representing the range of each attribute belonging to a cluster.

The operation processing unit 250 has an arithmetic logic unit such as a CPU (Central Processing Unit) and a peripheral circuit thereof. The operation processing unit 250 loads the program 243 from the storing unit 240 and executes the program 243 to realize various processing units by making the abovementioned hardware and the program 243 cooperate. Major processing units realized by the operation processing unit 250 include, for example, an acquiring unit 251, a merging unit 252, an anonymizing unit 253, a boundary information acquiring unit 254, and a boundary information transmitting unit 255.

The operation processing unit 250 may have, instead of the abovementioned CPU, a GPU (Graphic Processing Unit), a DSP (Digital Signal Processor), an MPU (Micro Processing Uni), an FPU (Floating point number Processing Unit), a PPU (Physics Processing Unit), a TPU (Tensor Processing Unit), a quantum processor, a microcontroller, a combination thereof, or the like.

The acquiring unit 251 acquires data for which consent to disclosure and merge has been obtained from the anonymization apparatus 300. For example, the acquiring unit 251 acquires the abovementioned data from the respective anonymization apparatuses 300 included by the anonymization system 100 via the communication I/F unit 230. That is to say, the acquiring unit 251 acquires the data from a plurality of anonymization apparatuses 300. Moreover, the acquiring unit 251 stores the acquired data as the consented data 241 into the storing unit 240.

The merging unit 252 merges the data acquired by the acquiring unit 251 from the respective anonymization apparatuses 300. For example, the merging unit 252 merges the data acquired from the respective anonymization apparatuses 300 based on the identification information, the common quasi-identifier and so forth included by the consented data 241. As illustrated in FIG. 1, one table can be generated from the tables corresponding to the respective organizations by the merge of the data by the merging unit 252.

For example, in a case where identical or corresponding identification information are assigned in the respective organizations, the merging unit 252 can perform merge using the identification information functioning as identifiers. In other words, the merging unit 252 can merge data having the same identification information among the data acquired from the anonymization apparatus 300-A and the data acquired from the anonymization apparatus 300-B. The merging unit 252 may perform merge using the common quasi-identifiers. For example, the merging unit 252 can merge data that all the common quasi-identifiers coincide among the data acquired from the anonymization apparatus 300-A and the data acquired from the anonymization apparatus 300-B. Moreover, in a case where the consented data 241 includes an identifier such as a name, the merging unit 252 may perform merge using the identifier. For example, the merging unit 252 can merge the data acquired from the respective anonymization apparatuses 300 by any of the methods illustrated above or by a combination thereof.

The anonymizing unit 253 performs the anonymization process on the data merged by the merging unit 252. For example, the anonymizing unit 253 performs k-anonymization as the anonymization process. By the anonymization process, the data merged by the merging unit 252 is divided into a plurality of clusters. That is to say, the anonymizing unit 253 performs a predetermined anonymization process on the merged data to generate a first anonymized cluster set composed of a plurality of clusters.

The anonymizing unit 253 can perform k-anonymization using the Mondrian method. For example, the anonymizing unit 253 calculates the median value in the cluster for each quasi-identifier, that is, for each attribute. Moreover, the anonymizing unit 253 calculates a change in information loss in the case of dividing the data by the abovementioned calculated median value. As an example, the anonymizing unit 253 calculates the difference between the sum of (maximum value–minimum value)/(total length of attribute) in two clusters after the division by the median value and (maximum value–minimum value)/(total length of attribute) in the cluster before the division, as the difference in information loss. After that, the anonymizing unit 253 selects an attribute with the largest difference in information loss, and divides the cluster by the median value of the selected attribute.

As illustrated in FIG. 6, the anonymizing unit 253 repeats the process of dividing the clusters by the abovementioned method until a predetermined condition is satisfied. For example, the anonymizing unit 253 can repeat the process of dividing each of the clusters so that the number of data in the cluster does not become less than k. In other words, the anonymizing unit 253 can repeat the process of dividing each of the clusters until a condition is satisfied that the number of data in the cluster becomes less than k if the cluster is divided more. In a case where the number of data in the cluster becomes less than k due to more division, the anonymizing unit 253 may finish the process without performing the division.

Note that k, which is an anonymization parameter used by the anonymizing unit 253 when performing the anonymization process, can be max (2, second k-rate), for example. Here, rate is the ratio of the data for which consent has been obtained to the total data. For example, the anonymization parameter k used to form the first anonymized cluster can be the greater of a value obtained by multiplying the anonymization parameter k to form a second anonymized cluster to be described later and rate or a given value determined in advance of 2. The anonymization parameter k to form the second anonymized cluster may be set in any manner, for example. The given value determined in advance may be a value other than 2.

The boundary information acquiring unit 254 acquires boundary information indicating the boundary between clusters based on the result of the anonymization process by the anonymizing unit 253. Moreover, the boundary information acquiring unit 254 stores the acquired boundary information as the division boundary information 242 into the storing unit 240.

For example, the boundary information acquiring unit 254 acquires information indicating the range of each quasi-identifier in each cluster as the boundary information based on each division axis that divides each cluster included in the first anonymized cluster set obtained in the anonymization process described above. In other words, the boundary information acquiring unit 254 acquires the boundary information that is information indicating the range of a quasi-identifier belonging to each cluster based on the result of the anonymization process. Note that the boundary information acquiring unit 254 may acquire information indicating the position of each division axis as the boundary information.

The boundary information transmitting unit 255 transmits the boundary information acquired by the boundary information acquiring unit 254 to the respective anonymization apparatuses 300. For example, the boundary information transmitting unit 255 can transmit the boundary information to the respective anonymization apparatuses 300 via the communication I/F unit 230.

The above is an example of the configuration of the boundary determination apparatus 200.

The anonymization apparatus 300 is an information processing apparatus that performs an anonymization process using boundary information received from the boundary determination apparatus 200. Moreover, the anonymization apparatus 300 can divide data possessed thereby into clusters by using the boundary information, and thereafter integrate the clusters or delete the cluster as necessary.

FIG. 7 shows an example of the configuration of the anonymization apparatus 300. Referring to FIG. 7, the anonymization apparatus 300 has, as major components, an operation input unit 310, a screen display unit 320, a communication I/F unit 330, a storing unit 340, and an operation processing unit 350, for example.

The anonymization apparatus 300, like the boundary determination apparatus 200, can employ various modification examples. For example, the anonymization apparatus 300 may be realized using a plurality of information processing apparatuses, such as being realized on the cloud. In addition, the anonymization apparatus 300 may not include part of the configuration illustrated above, for example, may not have the operation input unit 310 or the screen display unit 320, or the anonymization apparatus 300 may have a configuration other than the configuration illustrated above.

The configurations of the operation input unit 310, the screen display unit 320, and the communication I/F unit 330 may be the same as the configurations of the operation input unit 210, the screen display unit 220, and the communication I/F unit 230 described before.

The storing unit 340 is a storage device such as a hard disk and a memory. The storing unit 340 stores processing information necessary for a variety of processing by the operation processing unit 350 and a program 343. The program 343 is loaded to and executed by the operation processing unit 350 to realize various processing units. The program 343 is loaded in advance from an external device or a recording medium via a data input/output function such as the communication I/F unit 330, and stored into the storing unit 340. Major information stored in the storing unit 340 includes, for example, personal data 341 and division boundary information 342.

The personal data 341 includes data possessed by its organization. The personal data 341 may include not only data for which consent to disclosure and merge has been obtained, but also data for which consent to disclosure and merge has not been obtained. For example, the personal data 341 is acquired in advance by a method such as acquiring from an external device via the communication I/F unit 330 or inputting with the operation input unit 310, and stored in the storing unit 340.

For example, in the personal data 341, any identification information such as ID assigned to each person, a common quasi-identifier, and a unique quasi-identifier corresponding to its organization are associated. For example, in the personal data 341 possessed by the anonymization apparatus 300-A, identification information, a common quasi-identifier, and an A unique quasi-identifier are associated. In the personal data 341 possessed by the anonymization apparatus 300-B, identification information, a common quasi-identifier, and a B unique quasi-identifier are associated. As in the consented data 241, an identifier such as a name may be included in the personal data 341.

The division boundary information 342 includes boundary information acquired from the boundary determination apparatus 200. For example, the division boundary information 342 is updated in response to acquisition of the boundary information by a division boundary information acquiring unit 351 to be described later from the boundary determination apparatus 200.

The operation processing unit 350 has an arithmetic logic unit such as a CPU and a peripheral circuit thereof. The operation processing unit 350 loads the program 343 from the storing unit 340 and executes the program 343 to realize various processing units by making the abovementioned hardware and the program 343 cooperate. Major processing units realized by the operation processing unit 350 include, for example, a division boundary information acquiring unit 351, a dividing unit 351, and a cluster forming unit 353.

The operation processing unit 350, like the operation processing unit 250, may have a GPU or the like, instead of the abovementioned CPU.

The division boundary information acquiring unit 351 acquires boundary information from the boundary determination apparatus 200. For example, the division boundary information acquiring unit 351 acquires boundary information transmitted by the boundary determination apparatus 200 from the boundary determination apparatus 200 via the communication I/F unit 330. Moreover, the division boundary information acquiring unit 351 stores the acquired boundary information as the division boundary information 342 into the storing unit 340.

The dividing unit 352 performs an anonymization process using the boundary information acquired by the division boundary information acquiring unit 351. For example, the dividing unit 352 generates a second anonymized cluster set by dividing the data included by the personal data 341 into clusters by using boundary information acquired by the division boundary information acquiring unit 351. In other words, the dividing unit 352 generates a second anonymized cluster set, which is different from the first anonymized cluster set, by dividing data including data for which consent has not been obtained into clusters based on the boundary information.

For example, as described before, the boundary information indicates the range of each quasi-identifier belonging to each cluster. Then, the dividing unit 352 divides the data included by the personal data 341 into clusters based on the boundary information. As a result, each data included by the personal data 341 belongs to any one of a plurality of clusters forming the second anonymized cluster set.

The cluster forming unit 353 integrates clusters satisfying a predetermined condition after the division by the dividing unit 352. The integration of clusters by the cluster forming unit 353 ensures that the number of data in a cluster is k or more, and k-anonymity can be ensured while performing anonymization based on the boundary information.

For example, the cluster forming unit 353 can integrate clusters based on the number of data in a cluster. As an example, the cluster forming unit 353 integrates clusters so that there is no cluster in which the number of data is less than a predetermined value k. At this time, the cluster forming unit 353 may integrate clusters so that the degree of division of the common quasi-identifiers does not deteriorate as much as possible. The anonymization parameter k used by the cluster forming unit 353 when performing the integration may be set in any manner, for example.

For example, referring to FIG. 8, the cluster forming unit 353 enumerates clusters in which the numbers of data included in the clusters are less than k. Moreover, the cluster forming unit 353 selects one from the enumerated clusters by any method. After that, the cluster forming unit 353 calculates a change in the amount of information loss caused by the integration as a parameter for each of the clusters adjacent to the selected cluster. For example, the cluster forming unit 353 may calculate the difference in information loss by calculating the difference between the sum of (maximum value−minimum value)/(total length of attribute) of each axis before the integration and (maximum value−minimum value)/(total length of attribute) after the integration as in the process performed by the anonymizing unit 253. Then, the cluster forming unit 353 determines to integrate with a cluster in which the number of data becomes k or more by the integration and a change in the amount of information loss is the smallest, and integrates the clusters. For example, the cluster forming unit 353 can repeat the process of integrating the clusters by the above method until there is no cluster in which the number of data is less than k.

When calculating the information loss, the cluster forming unit 353 may calculate the amount of information loss by giving weight to the attribute of the common quasi-identifier and the attribute of the unique quasi-identifier. At this time, the cluster forming unit 353 may calculate the amount of information loss by giving different magnitudes of weights to the attribute of the common quasi-identifier and the attribute of the unique quasi-identifier. For example, the cluster forming unit 353 can give a greater weight to the attribute of the common quasi-identifier than to the attribute of the unique quasi-identifier. Consequently, integration with a cluster in which a change in common quasi-identifier is large can be suppressed. The magnitude of the weight may be set in any manner.

Further, the cluster forming unit 353 may delete a cluster, instead of or along with the integration process described above. For example, the cluster forming unit 353 may be configured to delete a cluster in which the number of data is less than k. It may be determined by any method whether the cluster forming unit 353 executes the integration process or the cluster deletion.

For example, as described above, the anonymization apparatus 300 performs the division by the dividing unit 352 as the anonymization process. Moreover, the anonymization apparatus 300 can perform the cluster integration and the cluster deletion by the cluster forming unit 353 as the anonymization process. Thus, the anonymization apparatus 300 is configured to be able to generate the second anonymized cluster set by division of data based on boundary information and also perform correction of the second anonymized cluster set by the cluster forming unit 353 as necessary.

The output unit 354 outputs the result of the process by the cluster forming unit 353, and so forth. For example, the output unit 354 can cause the screen display unit 320 to display on a screen the result of the process by the cluster forming unit 353, or transmit the result of the process to an external device via the communication I/F unit 330.

The above is an example of the configuration of the anonymization apparatus 300. Subsequently, an example of the operation of the boundary determination apparatus 200 and the anonymization apparatus 300 will be described with reference to FIGS. 9 and 10. First, an example of the operation of the boundary determination apparatus 200 will be described with reference to FIG. 9.

FIG. 9 is a flowchart showing an example of the operation of the boundary determination apparatus 200. Referring to FIG. 9, the acquiring unit 251 acquires data for which consent to merge with data possessed by another organization has been obtained, from the anonymization apparatus 300 (step S101).

The merging unit 252 merges the data acquired by the acquiring unit 251 from the respective anonymization apparatuses 300 (step S102). For example, the merging unit 252 merges the data acquired from the respective anonymization apparatuses 300 based on identification information, common-quasi identifiers, and so forth, included in the consented data 241.

The anonymizing unit 253 performs an anonymization process on the data merged by the merging unit 252 (step S103). For example, the anonymizing unit 253 performs k-anonymization as the anonymization process. By performing the anonymization process, the data merged by the merging unit 252 is divided into a plurality of clusters.

The boundary information acquiring unit 254 acquires boundary information indicating the boundary between the clusters based on the result of the anonymization process by the anonymizing unit 253 (step S104). For example, the boundary information acquiring unit 254 acquires, as the boundary information, information indicating the range of a quasi-identifier belonging to each of the clusters based on the result of the anonymization process.

The boundary information transmitting unit 255 transmits the boundary information acquired by the boundary information acquiring unit 254 to the respective anonymization apparatuses 300 (step S105).

The above is an example of the operation of the boundary determination apparatus 200. Subsequently, an example of the operation of the anonymization apparatus 300 will be described with reference to FIG. 10.

FIG. 10 is a flowchart showing an example of the operation of the anonymization apparatus 300. Referring to FIG. 10, the division boundary information acquiring unit 351 acquires the boundary information from the boundary determination apparatus 200 (step S201).

The dividing unit 352 divides data included in the personal data 341 into clusters using the boundary information acquired by the division boundary information acquiring unit 351 (step S202). In other words, the dividing unit 352 divides data including data for which the consent has not been obtained into clusters based on the boundary information.

The cluster forming unit 353 confirms whether or not each of the clusters satisfies a predetermined condition (step S203). For example, the cluster forming unit 353 confirms as the predetermined condition whether or not the number of data in cluster is a predetermined value k or more.

In a case where there is a cluster in which the number of data is less than the predetermined value k, the cluster forming unit 353 determines that cluster integration or cluster deletion is required (step S203, Yes). In response to this, the cluster forming unit 353 performs cluster integration or cluster deletion so as to remove a cluster in which the number of data is less than the predetermined value k (step S204). At this time, the cluster forming unit 353 may integrate the clusters so that the degree of division of the common quasi-identifier is not deteriorated as much as possible. On the other hand, in a case where there is no cluster in which the number of data is less than the predetermined value k, the cluster forming unit 353 determines that integration of the clusters, and so forth, are not required (step S203, No). In this case, the cluster forming unit 353 finishes the process such as integrating the clusters.

The above is an example of the operation of the anonymization apparatus 300.

As described above, the anonymization apparatus 300 has the division boundary information acquiring unit 351 and the dividing unit 352. With such a configuration, the dividing unit 352 can divide data possessed by its apparatus into clusters based on boundary information indicating the boundary between the clusters specified based on the consented data. As a result, granularity at the time of performing the anonymization process can be aligned as much as possible in the respective anonymization apparatuses 300. That is to say, the common quasi-identifiers to be margins for merging are anonymized with the same granularity as much as possible. Consequently, it is possible to increase the accuracy of analysis, for example, when merging the results of the anonymization process in the respective anonymization apparatuses 300.

Further, the anonymization apparatus 300 has the cluster forming unit 353. With such a configuration, the cluster forming unit 353 can perform cluster integration or cluster deletion in a case where the clusters satisfy a predetermined condition. By integration of the clusters by the cluster forming unit 353, it is ensured that the numbers of data in the clusters are k or more. As a result, it is possible to ensure the k-anonymity while performing anonymization based on the boundary information.

Further, in the present disclosure, when the cluster integration is performed, the clusters are integrated so that the degree of division of the common quasi-identifier is not deteriorated as much as possible. As a result, it is possible to make information loss occurring in anonymization as small as possible. Consequently, it is possible to increase the accuracy of analysis, for example, when merging the results of the anonymization process in the respective anonymization apparatuses 300.

Second Example Embodiment

Next, a second example embodiment of the present disclosure will be described with reference to FIGS. 11 to 13.

Figure 11:
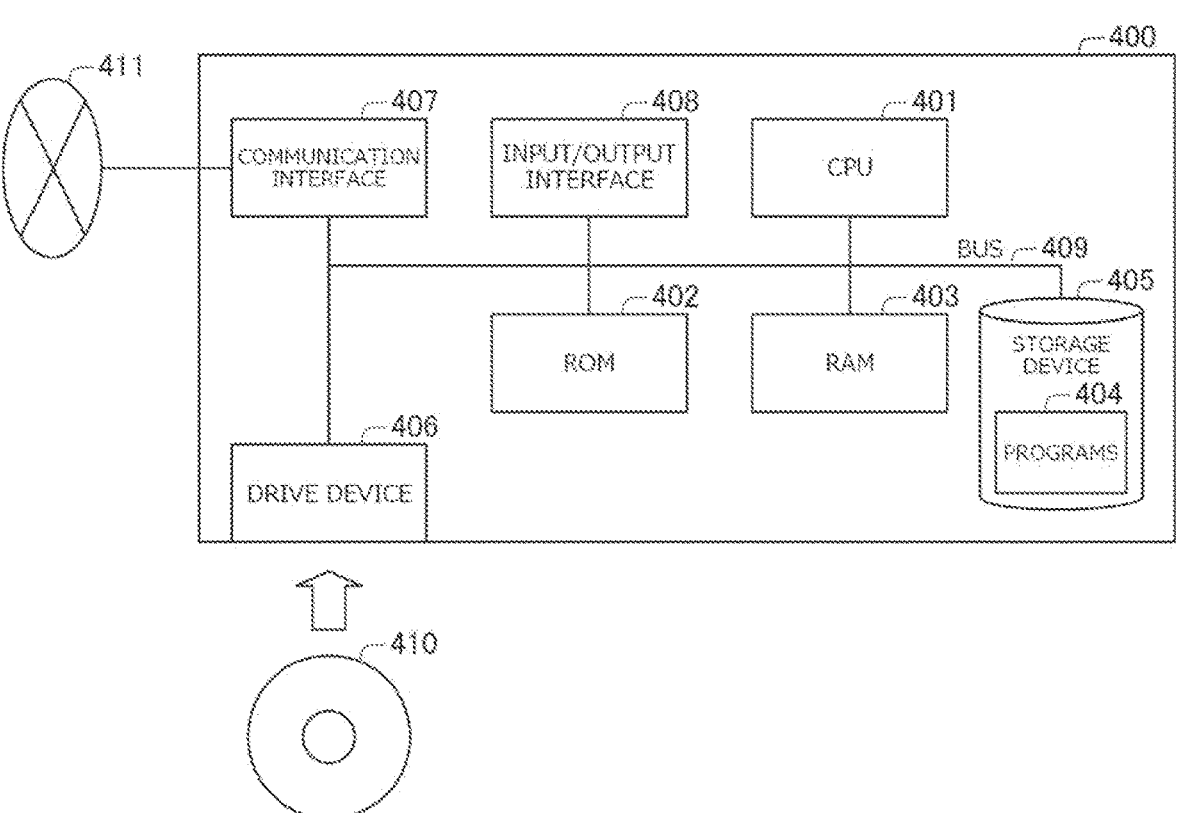
FIG. 11 is a view showing an example of the hardware configuration of an anonymization apparatus in a second example embodiment of the present disclosure.

FIG. 11 is a view showing an example of the hardware configuration of an anonymization apparatus 400. FIG. 12 is a block diagram showing an example of the configuration of the anonymization apparatus 400. FIG. 13 is a block diagram showing an example of the configuration of a determination apparatus 500.

In the second example embodiment of the present disclosure, an example of the configuration of the anonymization apparatus 400, which is an information processing apparatus that performs an anonymization process on data possessed thereby, will be described. Moreover, an example of the configuration of the determination apparatus 500 that determines boundary information used by the anonymization apparatus 400 when performing the anonymization process will be described. FIG. 11 shows an example of the hardware configuration of the anonymization apparatus 400. Referring to FIG. 11, the anonymization apparatus 400 has the following hardware configuration as an example, including;

- a CPU (Central Processing Unit) 401 (arithmetic logic unit),
- a ROM (Read Only Memory) 402 (memory unit),
- a RAM (Random Access Memory) 403 (memory unit),
- programs 404 loaded to the RAM 403,
- a storage device 405 storing the programs 404,
- a drive device 406 reading from and writing into a recording medium 410 outside the information processing apparatus,
- a communication interface 407 connected to a communication network 411 outside the information processing apparatus,
- an input/output interface 408 inputting and outputting data, and
- a bus 409 connecting the respective components.

Figure 12:
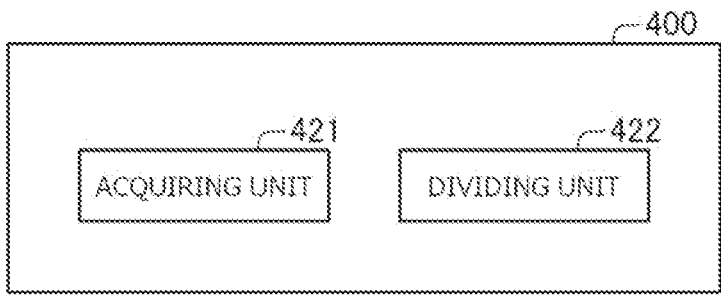
FIG. 12 is a block diagram showing an example of the configuration of the anonymization apparatus.
Figure 13:
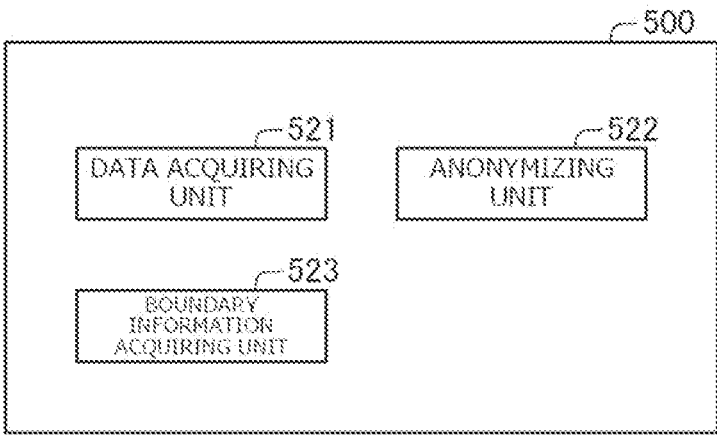
FIG. 13 is a block diagram showing an example of the configuration of a determination apparatus.

Further, the anonymization apparatus 400 can realize functions as an acquiring unit 421 and a dividing unit 422 shown in FIG. 12 by acquisition and execution of the programs 404 by the CPU 401. The programs 404 are, for example, stored in the storage device 405 or the ROM 402 in advance, and loaded to the RAM 403 and executed by the CPU 401. The programs 404 may be supplied to the CPU 401 via the communication network 411, or may be stored in the recording medium 410 in advance and retrieved and supplied to the CPU 401 by the drive device 406.

FIG. 11 shows an example of the hardware configuration of the anonymization apparatus 400. The hardware configuration of the anonymization apparatus 400 is not limited to the abovementioned case. For example, the anonymization apparatus 400 may be configured by part of the abovementioned configuration, such as not having the drive device 406. Moreover, the CPU 401 may be a GPU or the like illustrated in the first example embodiment.

The acquiring unit 421 acquires boundary information indicating the boundary between clusters, specified by an anonymization process performed on predetermined data. For example, the acquiring unit 421 can acquire boundary information indicating the boundary between clusters, specified by an anonymization process performed on the result of merging data acquired from a plurality of organizations.

The dividing unit 422 generates an anonymized cluster set by dividing data possessed by its apparatus into a plurality of clusters based on the boundary information acquired by the acquiring unit 421.

As described above, the anonymization apparatus 400 has the acquiring unit 421 and the dividing unit 422. With the configuration as described above, the dividing unit 422 can generate an anonymized cluster set by dividing data possessed by its apparatus into a plurality of clusters based on the boundary information acquired by the acquiring unit 421. As a result, granularity at the time of performing the anonymization process can be aligned as much as possible in the respective anonymization apparatuses 400. Consequently, it is possible to increase the accuracy of analysis, for example, when merging the results of the anonymization process in the respective anonymization apparatuses 400.

The anonymization apparatus 400 described above can be realized by installation of a predetermined program in an information processing apparatus such as the anonymization apparatus 400. Specifically, a program as another aspect of the present invention is a program for causing an information processing apparatus such as the anonymization apparatus 400 to realize processes to acquire boundary information indicating the boundary between clusters, specified by an anonymization process performed on predetermined data, and generate an anonymized cluster set by dividing data possessed by the apparatus into a plurality of clusters based on the acquired boundary information.

Further, an anonymization method executed by an information processing apparatus such as the anonymization apparatus 400 described above is a method including, by an information processing apparatus, acquiring boundary information indicating the boundary between clusters, specified by an anonymization process performed on predetermined data, and generating an anonymized cluster set by dividing data possessed by the apparatus into a plurality of clusters based on the acquired boundary information.

Since inventions of a program, a computer-readable recording medium with the program recorded thereon, and an anonymization method having the configurations described above exerts the same actions and effects as the anonymization apparatus 400 described above, the object of the present disclosure described above can be achieved.

Further, the determination apparatus 500 acquiring the boundary information acquired by the anonymization apparatus 400, or a determination method and a program executed by the determination apparatus 500 can also achieve the same object as in the above case. For example, referring to FIG. 13, the determination apparatus 500 has a data acquiring unit 521 acquiring data from a plurality of organizations, an anonymizing unit 522 merging the data acquired by the data acquiring unit 521 and performing an anonymization process, and a boundary information acquiring unit 523 acquiring boundary information indicating the boundary between clusters based on the result of the anonymization process by the anonymizing unit 522. The hardware configuration of the determination apparatus 500 may be the same as the configuration of the anonymization apparatus 400 described with reference to FIG. 11. For example, the determination apparatus 500 can realize the respective processing units described above by acquisition and execution of the programs stored in the storage device by the CPU.

<Supplementary Notes>

The whole or part of the example embodiments disclosed above can be described as the following supplementary notes. Below, the overview of the anonymization apparatus and so forth according to the present invention will be described. Meanwhile, the present invention is not limited to the following configurations.

(Supplementary Note 1)

An anonymization apparatus comprising:

an acquiring unit configured to acquire boundary information indicating a boundary between clusters, specified by performing an anonymization process on predetermined data; and a dividing unit configured to generate an anonymized cluster set by dividing data possessed by the anonymization apparatus into a plurality of clusters based on the boundary information acquired by the acquiring unit.

(Supplementary Note 2)

The anonymization apparatus according to Supplementary Note 1, comprising a cluster forming unit configured to integrate or delete a cluster satisfying a predetermined condition among the clusters included by the anonymized cluster set obtained by the division by the dividing unit.

(Supplementary Note 3)

The anonymization apparatus according to Supplementary Note 2, wherein the cluster forming unit is configured to integrate or delete the cluster based on a number of data in the cluster.

(Supplementary Note 4)

The anonymization apparatus according to Supplementary Note 2 or 3, wherein:

the data includes a common quasi-identifier possessed by a plurality of organizations in common and a unique quasi-identifier; and the cluster forming unit is configured to integrate the cluster based on a parameter calculated by giving different weights to the common quasi-identifier and the unique quasi-identifier.

(Supplementary Note 5)

The anonymization apparatus according to Supplementary Note 4, wherein the cluster forming unit is configured to integrate the cluster based on the parameter calculated by giving a greater weight to the common quasi-identifier than to the unique quasi-identifier.

(Supplementary Note 6)

The anonymization apparatus according to any of Supplementary Notes 1 to 5, wherein the acquiring unit is configured to acquire the boundary information indicating the boundary between the clusters, specified by performing the anonymization process on a result of merging the data acquired from a plurality of organizations.

(Supplementary Note 7)

The anonymization apparatus according to any of Supplementary Notes 1 to 6, wherein the acquiring unit is configured to acquire the boundary information indicating the boundary between the clusters, specified by performing the anonymization process on data including at least part of the data possessed by the anonymization apparatus.

(Supplementary Note 8)

An anonymization method by an information processing apparatus, the method comprising:

acquiring boundary information indicating a boundary between clusters, specified by performing an anonymization process on predetermined data; and generating an anonymized cluster set by dividing data possessed by the anonymization apparatus into a plurality of clusters based on the acquired boundary information.

(Supplementary Note 9)

A computer program comprising instructions for causing an information processing apparatus to realize processes to:

acquire boundary information indicating a boundary between clusters, specified by performing an anonymization process on predetermined data; and generate an anonymized cluster set by dividing data possessed by the anonymization apparatus into a plurality of clusters based on the acquired boundary information.

(Supplementary Note 10)

A determination apparatus comprising:

a data acquiring unit configured to acquire data from a plurality of organizations;

an anonymizing unit configured to merge the data acquired by the acquiring unit and perform an anonymization process; and a boundary information acquiring unit configured to acquire boundary information indicating a boundary between clusters based on a result of the anonymization process by the anonymizing unit.

(Supplementary Note 11)

The determination apparatus according to Supplementary Note 10, comprising a transmitting unit configured to transmit the boundary information acquired by the boundary information acquiring unit to an anonymization apparatus.

(Supplementary Note 12)

The determination apparatus according to Supplementary Note 11, wherein the anonymizing unit is configured to determine an anonymization parameter used when the determination apparatus performs the anonymization process based on an anonymization parameter used when the anonymization apparatus performs an anonymization process.

(Supplementary Note 13)

The determination apparatus according to Supplementary Note 12, wherein the anonymizing unit is configured to determine the anonymization parameter used when the determination apparatus performs the anonymization process, based on a greater value of a value obtained by multiplying the anonymization parameter used when the anonymization apparatus performs the anonymization process by a predetermined value and a value determined in advance.

(Supplementary Note 14)

A determination method by an information processing apparatus, the determination method comprising:

acquiring data from a plurality of organizations;

merging the acquired data and performing an anonymization process; and acquiring boundary information indicating a boundary between clusters based on a result of the anonymization process.

(Supplementary Note 15)

A computer program comprising instructions for causing an information processing apparatus to realize processes to:

acquire data from a plurality of organizations;

merge the acquired data and perform an anonymization process; and acquire boundary information indicating a boundary between clusters based on a result of the anonymization process.

(Supplementary Note 16)

An anonymization system comprising:

a determination apparatus including: a data acquiring unit configured to acquire data from a plurality of organizations; an anonymizing unit configured to merge the data acquired by the acquiring unit and perform an anonymization process; and a boundary information acquiring unit configured to acquire boundary information indicating a boundary between clusters based on a result of the anonymization process by the anonymizing unit; and an anonymization apparatus including: an information acquiring unit configured to acquire the boundary information acquired by the boundary information acquiring unit; and a dividing unit configured to generate an anonymized cluster set by dividing data possessed by the anonymization apparatus into a plurality of clusters based on the boundary information acquired by the information acquiring unit.

The program described in the example embodiments and supplementary notes is stored in a storage device or recorded on a computer-readable recording medium. For example, the recording medium is a portable medium such as a flexible disk, an optical disk, a magneto-optical disk, and a semiconductor memory.

Although the present invention has been described above with reference to the example embodiments, the present invention is not limited to the example embodiments. The configurations and details of the present invention can be changed in various manners that can be understood by one skilled in the art within the scope of the present invention.

DESCRIPTION OF REFERENCE NUMERALS 100 anonymization system
200 boundary determination apparatus
210 operation input unit
220 screen display unit
230 communication I/F unit
240 storing unit
241 consented data
242 division boundary information
243 program
250 operation processing unit
251 acquiring unit
252 merging unit
253 anonymizing unit
254 boundary information acquiring unit
255 boundary information transmitting unit
300 anonymization apparatus
310 operation input unit
320 screen display unit
330 communication I/F unit
340 storing unit
341 personal data
342 division boundary information
343 program
350 operation processing unit
351 division boundary information acquiring unit
352 dividing unit
353 cluster forming unit
400 anonymization apparatus
401 CPU
402 ROM
403 RAM
404 programs
405 storage device
406 drive device
407 communication interface
408 input/output interface
409 bus
410 recording medium
411 communication network
421 acquiring unit
422 dividing unit
500 determination apparatus
521 data acquiring unit
522 anonymizing unit
523 boundary information acquiring unit

The invention claimed is:

1. An anonymization apparatus comprising:
at least one memory configured to store instructions; and
at least one processor configured to execute the instructions to:
acquire boundary information indicating a boundary between clusters obtained by dividing data with consent for disclosure, specified by performing an anonymization process on the data with the consent; and
generate an anonymized cluster set from data possessed by the anonymization apparatus by dividing the data possessed by the anonymization apparatus including data without consent for disclosure into a plurality of clusters based on the acquired boundary information.

2. The anonymization apparatus according to claim 1, wherein the at least one processor is configured to execute the instructions to
integrate or delete a cluster satisfying a predetermined condition among the clusters included by the anonymized cluster set obtained by the dividing.

3. The anonymization apparatus according to claim 2, wherein the at least one processor is configured to execute the instructions to
integrate or delete the cluster based on a number of data in the cluster.

4. The anonymization apparatus according to claim 2, wherein:
the data includes a common quasi-identifier possessed by a plurality of organizations in common and a unique quasi-identifier; and
the at least one processor is configured to execute the instructions to integrate the cluster based on a parameter calculated by giving different weights to the common quasi-identifier and the unique quasi-identifier.

5. The anonymization apparatus according to claim 4, wherein the at least one processor is configured to execute the instructions to
integrate the cluster based on the parameter calculated by giving a greater weight to the common quasi-identifier than to the unique quasi-identifier.

6. The anonymization apparatus according to claim 1, wherein the at least one processor is configured to execute the instructions to
acquire the boundary information indicating the boundary between the clusters, specified by performing the anonymization process on a result of merging the data acquired from a plurality of organizations.

7. The anonymization apparatus according to claim 1, wherein the at least one processor is configured to execute the instructions to
acquire the boundary information indicating the boundary between the clusters, specified by performing the anonymization process on data including at least part of the data possessed by the anonymization apparatus.

8. An anonymization method by an information processing apparatus, the method comprising:
acquiring boundary information indicating a boundary between clusters obtained by dividing data with consent for disclosure, specified by performing an anonymization process on the data with the consent; and
generating an anonymized cluster set from data possessed by an anonymization apparatus by dividing the data possessed by the anonymization apparatus including data without consent for disclosure into a plurality of clusters based on the acquired boundary information.

* * * * *